ROBERT WILLIAM BLACKBURN
WILLIAM MARRIOTT BROWN
EDWARD JAMES ADAMS
INVENTOR.

PATENT AGENT

ROBERT WILLIAM BLACKBURN
WILLIAM MARRIOTT BROWN
EDWARD JAMES ADAMS
INVENTOR.

United States Patent Office 3,357,889
Patented Dec. 12, 1967

3,357,889
LIQUID MODERATED, LIQUID COOLED NUCLEAR REACTOR INSTALLATION
Robert William Blackburn, Ottawa, Ontario, and William Marriott Brown and Edward James Adams, Peterborough, Ontario, Canada, assignors to Canadian General Electric Company, Limited, Toronto, Ontario, Canada, a corporation of Canada
Filed Aug. 2, 1965, Ser. No. 476,610
Claims priority, application Canada, May 29, 1965, 931,950
3 Claims. (Cl. 176—52)

This invention relates to liquid moderated nuclear reactors, and in particular to simplified reactor structure and shielding therefor.

Prior to the development of this invention the Candu type of nuclear reactor as used in the Douglas Point station had a separate calandria containing the nuclear chain reaction assembly, the liquid coolant, and the liquid moderator. A moderator dump tank was located below the calandria, and moderator flow channels connected the calandria to the tank. The entire calandria-dump tank structure was surrounded by heavy steel thermal shields and isolated in a massive vault made of dense concrete reinforced with steel rods. A gas atmosphere was maintained in the vault. Cooling ducts were provided for gas cooling of the thermal shields, and water cooling coils were provided in the concrete walls and supporting structure in regions where heating was excessive. Although this arrangement was considered satisfactory, it resulted in a relatively high cost installation.

It is therefore the object of this invention to simplify and improve the functional and structural features and efficiency of a reactor installation, and to reduce the cost thereof.

The invention will now be described with reference to the attached drawings in which.

Figure 1:
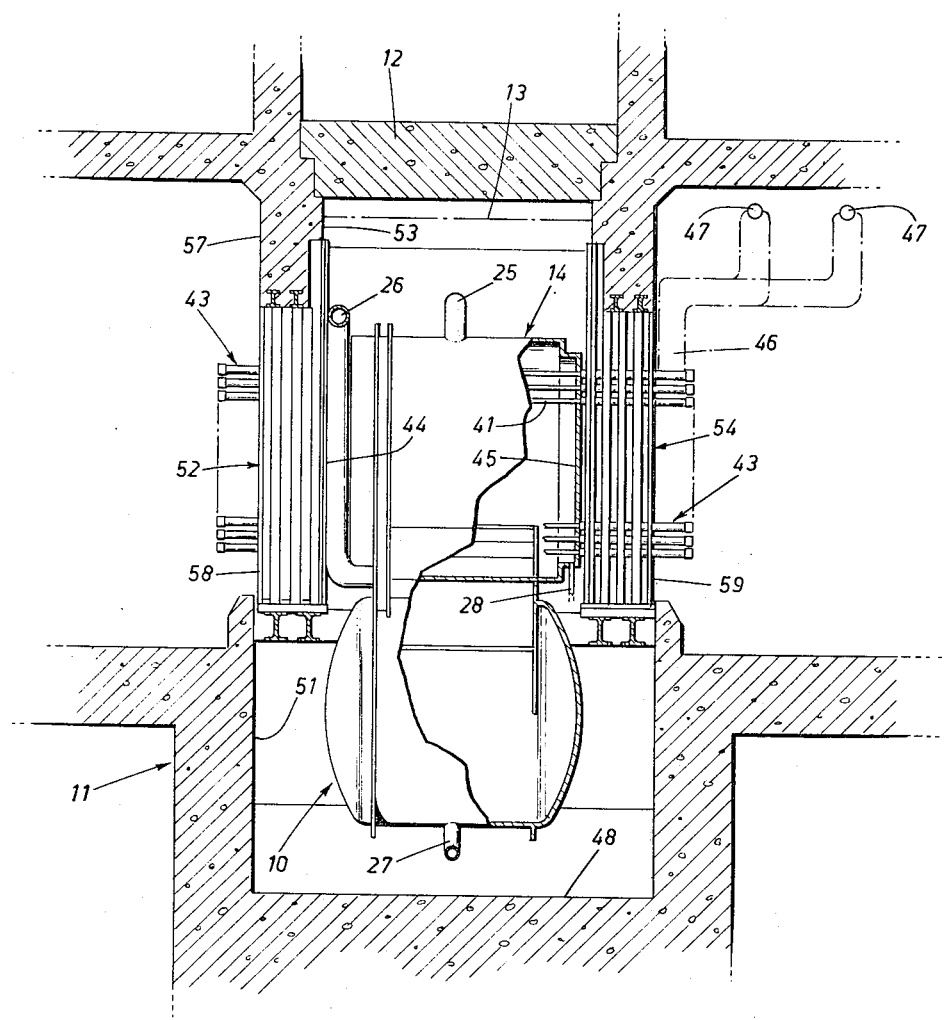
FIGURE 1 is a longitudinal cross section of a reactor and its installation structure according to the invention.
Figure 2:
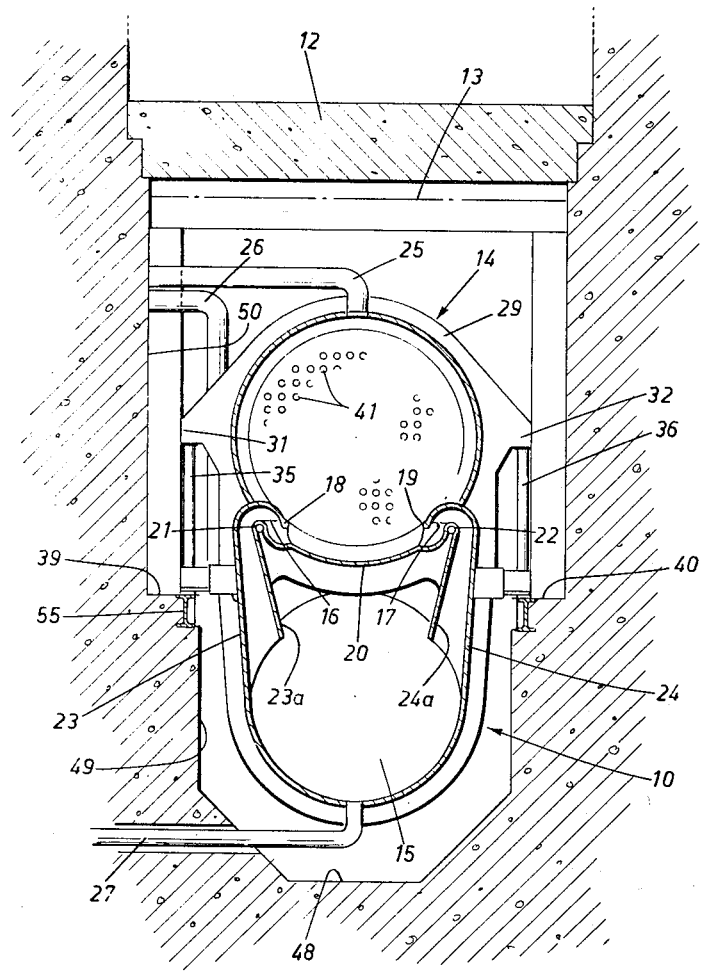
FIGURE 2 is a transverse cross section of the structures shown in FIGURE 1.

There is shown in FIGURES 1 and 2 a nuclear reactor 10 located inside a water tight vault 11 having an upper open side closed by means of a cover 12 sealed to the walls of the vault. The reactor is supported inside the vault in spaced relation to the walls thereof in a pool of water (generally ordinary water) rising to a level 13 well above the reactor. All the joints in the vault, openings for pipes and calandria tubes, and any other places where water can leak out are sealed. An inert gas such as helium fills the space between the water and the cover, with some means provided for displacement of the gas to accommodate changes in the water level.

Reactor 10 is an integral structure of a calandria 14 located directly above a moderator dump tank 15 as a single enclosed vessel. This arrangement is not limited to a horizontally disposed calandria having horizontally disposed fuel tubes as illustrated in the drawings; it can also be applied to a vertically disposed calandria. In the preferred configuration, the calandria is a cylindrical container having its longitudinal axis horizontal and having moderator dump ports along each side near the bottom as shown at 16, 17 in FIGURE 2; there are no ports at the ends of the calandria. The calandria has the lower portion of each side wall turned in a little and terminated in a horizontal plane in the downturned lips 18 and 19 respectively. As best seen in FIGURE 2, the bottom wall 20 of the calandria has its longitudinal edge portions turned outwardly of lips 18, 19 and terminated a relatively short distance above the aforementioned plane in unturned lips 21, 22; lips 21, 22 are spaced outwardly from lips 18, 19 respectively, and all four lips extend almost the length of the calandria. Lips 18 and 21 define port 16, and lips 19 and 22 define port 17. Dump tank 15 is a conventional type of pressure vessel; it is open at the top, has its end walls united with the end walls of the calandria, and has its side walls extending above the tank proper and united with the side walls of the calandria well above the upturned lips. Side wall 23 is spaced outwardly and upwardly of lip 21 so as to leave an open passage for liquid to flow from port 16 into the tank. Wall 24 is similarly disposed with reference to lip 22. Structural members inside the tank secured to the upper portions of its walls support wall 20 and define liquid flow passages from the ports down into the tank. These structural members include the inner wall portions 23a and 24a. In essence, the reactor vessel is actually a single container divided into an upper calandria and a lower dump tank by means of wall 20, the ports providing the only internal communication between the two. Dump ports of this general character are known, a specific version having been used in the NPD-2 and Douglas Point reactors. However, in these cases the dump ports were not incorporated in an integral structure of a calandria and a dump tank.

The liquid moderator is held up in the calandria by means of gas under pressure in the dump tank exerting a downward force on the liquid surface in ports 16 and 17. This gas pressure can be set to hold up a given head of liquid in the calandria, and in case of an emergency calling for shutdown of the nuclear reaction, it can be suddenly released, allowing the moderator to be dumped into the tank. In practice there is a gas such as helium, above as well as below the moderator, but the gas pressure in the tank is greater by the head of liquid moderator to be supported. Numeral 25 designates the gas line connected to the top of the calandria and 26 the line connected to the top of the tank. Liquid moderator can be removed from the tank via line 27 and pumped into the calandria via line 28.

The calandria-dump tank assembly is reinforced and supported by means of two stiffening rings 29, 30 which surround the assembly and are secured thereto. Ring 29 is located near one end of the assembly, and it has a pair of lugs 31, 32 projecting outwardly therefrom at about the middle of the calandria. This ring is shown in FIGURE 2. A similar ring 30 is located at the other end of the assembly; it has a similar pair of outwardly projecting lugs, one of which is shown at 33 in FIGURE 3. Each one of the four lugs 31 to 34 has an under surface adapted to rest on the upper end of an upright post or column for support of the reactor. Three of the four posts are shown at 35, 36, and 37 in FIGURES 2 and 3; two of them 35, 37 stand on a ledge 39 on one side of the vault and the other two 36, 38 stand on a ledge 40 on the other side of the vault.

Figure 3:
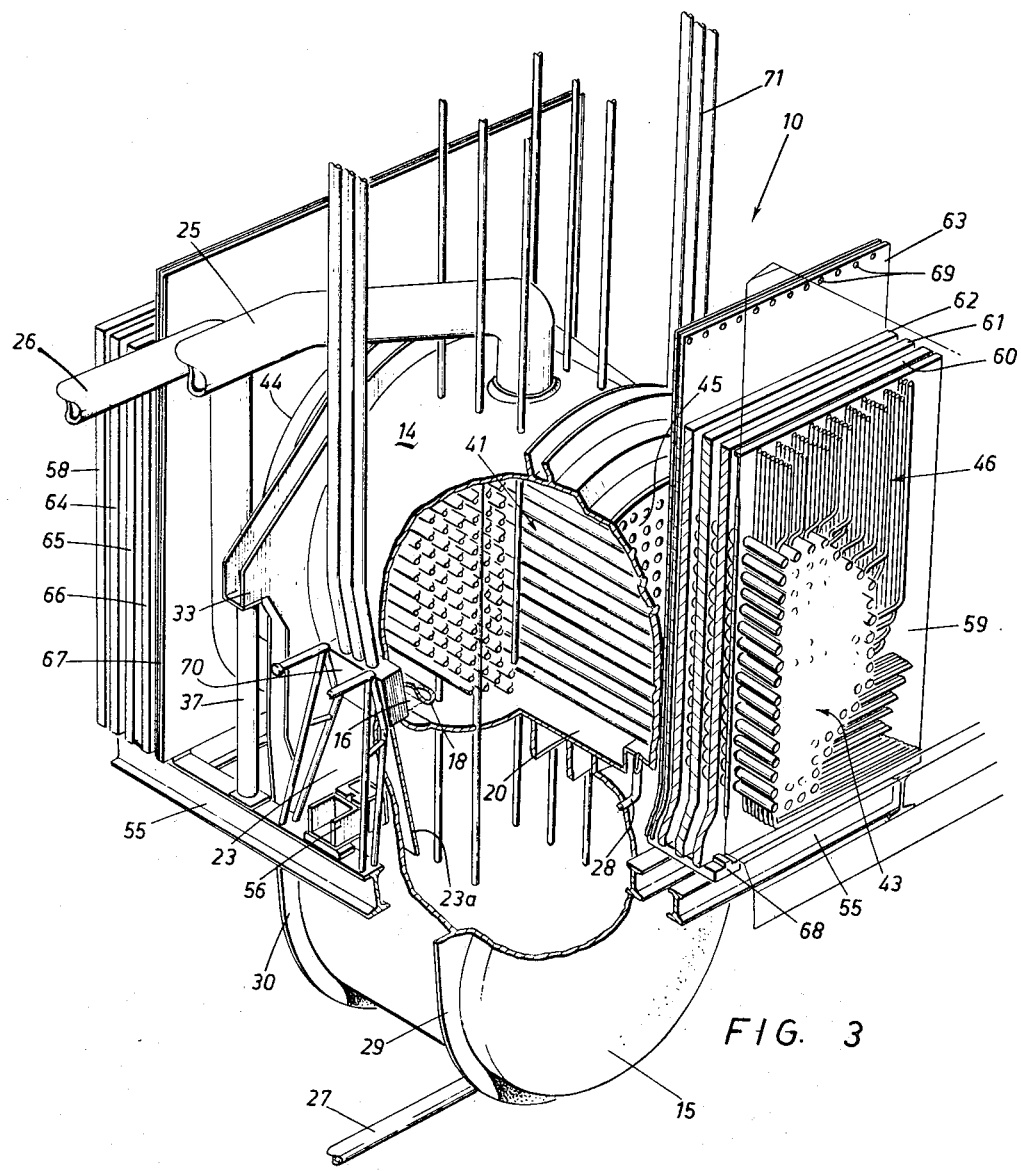
FIGURE 3 is a view in perspective of the reactor shown in FIGURES 1 and 2.

The nuclear chain reaction assembly is essentially the design used in the NPD-2 and Douglas Point reactors. In brief, it consists of a plurality of straight, circular calandria tubes 41 passing horizontally through the calandria parallel to the longitudinal axis thereof in spaced relation to each other and to the circular wall of the calandria. Each tube passes through both end walls of the cylindrical calandria and has a substantial length at each end projecting from the calandria. FIGURES 1 and 3 show the calandria tubes 41 and the ends thereof projecting from end walls 44, 45 of the calandria. Tubes 41 are secured to walls 44, 45 as liquid tight joints. A coolant tube 43 is provided for each calandria tube 41. This tube is smaller in diameter and substantially longer than the calandria tube, and is supported inside the calandria tube on the same axis with both ends projecting some distance from the calandria tube. With this arrangement, a small annular space is left between each calandria tube and its coolant tube for a thermal insulating medium such as an insulating gas. Each coolant tube is adapted to hold a number of nuclear fuel assemblies and contain a high pressure coolant circulating through it to remove heat from the fuel. On power fueling is carried out by means of two fueling machines, one at each end of the tubes; the machines are remotely controlled to select a coolant tube, attach themselves to the ends of this tube, remove the end plugs from the tube, perform the fueling operation, insert the end plugs, and then detach themselves from the tube. Feeder pipes 46 connect the projecting ends of coolant tubes 43 to heat exchangers 47, and transport hot coolant to the heat exchanger and cool coolant from the exchangers back to the tubes.

Vault 11 is a container adapted to hold reactor 10 and a pool of water submerging the reactor. It has a bottom wall 48, side and end walls, and open top side closed by cover 12. As best seen in FIGURE 2, the side wall on the left has a lower wall portion 49 rising at an incline and then vertically from the bottom wall to a ledge 39 and an upper wall portion 50 spaced outwardly from wall portion 49 and rising vertically from the ledge to the top of the vault. The other side wall is the same; it has a ledge 40. Ledges 39 and 40 extend the length of the wall and present two upwardly facing surfaces lying in the same horizontal plane. Posts 35 to 38 stand on these surfaces and thereby support the reactor in the way mentioned earlier.

Referring again to FIGURE 1, it will be seen that the end wall on the left has a lower wall portion 51 rising vertically from the bottom wall, a rectangular window 52, and an upper vertical wall portion 53. Wall portion 53 is set in with respect to wall portion 51 such that its outer surface 57 is in approximately the same vertical plane as the inner surface of the lower wall portion. The window is about the same width as the wall, and it extends from the ledges to a little above the calandria. The other end wall is the same; it has a window 54 directly opposite window 52. The vault and the cover therefor are made of concrete reinforced with steel rods. A rectangular frame 55 made of steel I-beams is embedded in the concrete of the ledges and the window sills. This structure provides the bearing surfaces for the posts which support the reactor, and supports the heavy shielding plates to be described in the next paragraph. I-beams are also embedded in the concrete around each window to strengthen the structure. The entire vault is lined with steel plates anchored to the concrete and welded together so as to make the vault water tight. Openings to the vault for pipelines such as 27 (FIGURE 2), or for other purposes, are sealed.

The reactor is located in the middle of the vault spaced from the walls thereof with the tube ends at one end of the calandria projecting through window 52 and the tube ends at the other end of the calandria projecting through window 54. Window 52 is closed by means of a rectangular steel plate 58 resting on and keyed to the I-beams of frame 55 in the window sill and welded along its four edges to the steel lining in the vault. The ends of the calandria tubes pass through holes in plate 58 and terminate just outside the plate. The end of each calandria tube is secured to the plate as a water-tight joint. A similar plate 59 closes the other window and contain holes in which the other ends of the calandria tubes are sealed. Both ends of the calandria tubes terminate at the outer surface of the plates, and both ends of the coolant tubes project outwardly from the plates some distance as shown in FIGURES 1 and 3. All the joints between the calandria tube ends and the plates and between the plates and the lining are made water-tight.

Plates 58 and 59 may be composite structures consisting of a circular stainless steel disk surrounded by a carbon steel plate, the two being welded together. The stainless steel disk receives and is secured to the calandria tube ends which are also made of stainless steel; hence the joints are made of metals with the same thermal expansion characteristics. The outer carbon steel portion is welded to the carbon steel vault lining, and its outer edges stiffened so as to render the middle of the plate relatively yieldable to accommodate slight movements of the reactor structure due to thermal expansion. Calandria tubes 41 also serve as the rods which support plates 58, 59 against the hydrostatic loading of the water shielding.

A number of relatively thick plates of carbon steel placed between each window closure plate and the end of the calandria further block the window opening against radiation, that is, the plates plus the water between them serve as biological and thermal shields. These plates stand upright on the I-beam window sill spaced from the closure plate and from each other, have clearance holes through which the tube ends pass, and are secured to the window reinforcing members, as for example, by means of keys such as that illustrated at 68 in FIGURE 3. In this figure, shielding plates 60 to 63 are shown between the closure plate 59 and the end wall 45 of the calandria, and shielding plates 64 to 67 are shown between the closure plate 58 and the end wall 44 of the calandria. Small holes through shielding plates 60 and 67 along the edges thereof, such as those indicated at 69, allow the water in which the reactor is submerged to circulate freely between the plates to remove heat therefrom and supplement the shielding of the windows. The innermost plates 63 and 67 stand higher than the other plates and serve mainly as thermal shields.

A centering key 56 is located on each side of the reactor vessel. This key has one part secured to frame 55 and another part secured to the wall of the dump tank. The key is constructed in such a way that the reactor can move vertically but cannot move horizontally.

Two ion chamber assemblies 70 are included as shown in FIGURE 3; and one is located on each side of the reactor. Each assembly is supported on a ledge spaced from the wall of the reactor, thus allowing water to circulate between the two for cooling them.

As stated above, the calandria tubes terminate in plates 58 and 59 and are sealed thereto, whereas the ends of the coolant tubes project beyond the plates. With this arrangement, it is possible to seal off the annular space between each calandria tube and its coolant tube and introduce an insulating gas into the space. Preferably, this gas will be separate and distinct from the gaseous atmosphere outside the ends of the coolant tubes. Hence, the gas used inside the reactor where radiation is high is not mixed with the gas outside the reactor where radiation is much lower.

During operation of the reactor, the light water in the vault used for shielding the reactor will be continually cooled and purified. The system employed will be a typical reactor auxiliary including heat exchangers, pumps, valves, bypass purification circuit, and gas holder. Similarly, a conventional system will be employed to conditioning gas covering the water and the gas used elsewhere in the reactor. Proper circulation and cooling of the water will adequately cool the walls of the vault; therefore, cooling ducts in the concrete will now be unnecessary.

The reactor structure and the reactor shielding of this invention represents significant improvements on earlier reactors of this type. Some of the advantages of the new arrangement are given below.

(1) The integral calandria and dump tank assembly is more compact and takes up considerably less space than do the separate units.

(2) Water is an effective shielding medium for a nuclear reactor. It is plentiful, inexpensive, and can be readily handled with conventional equipment.

(3) Submerging a reactor in water in the way proposed above, reduces the physical size of the overall structure, eliminates heavy steel side shields, and leads to a simpler structural arrangement.

(4) Smaller and simpler structures require less building space, and simplify some auxiliary installations.

These advantages along with others which will readily occur to those skilled in the art combine to yield one very important advantage; the reactor and the structure associated with it can now be constructed for less money. This can be done without sacrificing performance. The cost factors become all the more significant when it is realized that nuclear reactors are still in the early stages of development, and as a result, the installations tend to be elaborate and very costly.

What we claim as new and desire to secure by Letters Patent of the United States is:

1. A liquid moderated, liquid cooled nuclear reactor installation comprising a closed vessel divided by transverse wall means into an upper calandria portion and a lower moderator dump tank portion; a nuclear chain reaction assembly located within said calandria portion including a plurality of individual calandria fuel tubes each having at least one end thereof extending from said calandria portion to the outside of the vault through a window plate mounted in sealing relation with adjacent wall portions of the vault, the outer periphery of each said tube being sealingly attached to said window plate; integral moderator dump port structure in said transverse wall means for holding liquid moderator in said calandria by means of gas under pressure in said dump tank, and allowing moderator to flow freely from said calandria into said dump tank on decrease in the pressure of the holding gas; a water filled vault surrounding said vessel to provide cooling to the walls of the vessel to maintain the temperature thereof substantially uniform serving to shield the reactor, said window further having submerged free-standing shielding plates interposed between said aforementioned window plate and said calandria portion, mounted substantially parallel and spaced to permit circulation of cooling water in cooling and shielding relation therebetween.

2. The structure as claimed in claim 1 wherein a coolant tube is located inside each calandria tube in radially spaced relation so as to define an annular space between the tubes, and with the ends of the coolant tube projecting from the ends of the calandria tube.

3. The structure as claimed in claim 2 including insulant gas supply means connected with the annular spaces of said tubes, and isolated from the atmosphere adjacent said reactor vault.

References Cited

UNITED STATES PATENTS

| | | | |
|---|---|---|---|
| 3,001,923 | 9/1961 | Tunnicliffe et al. | 176—52 |
| 3,115,450 | 12/1963 | Schanz | 176—87 |
| 3,149,046 | 9/1964 | Boyd. | |
| 3,192,121 | 6/1965 | Challender et al. | 176—87 |
| 3,280,000 | 10/1966 | Blackburn | 176—32 |

OTHER REFERENCES

AECL, 799, December 1960, pages 11–7 and 11–13.

AECL, 1568, October 1962, pages 192–198.

AECL, 1596, December 1962, pages 4, 5, 7–11 and 29–33.

AECL, 1692, 1963, chapter VI, pages 8, 9, and 15.

L. DEWAYNE RUTLEDGE, *Primary Examiner.*